(12) United States Patent
Nakano et al.

(10) Patent No.: US 10,502,114 B2
(45) Date of Patent: Dec. 10, 2019

(54) CONCENTRATION CALCULATION APPARATUS, CONCENTRATION CALCULATION SYSTEM, AND CONCENTRATION CALCULATION METHOD

(71) Applicant: NGK SPARK PLUG CO., LTD., Nagoya-shi, Aichi (JP)

(72) Inventors: Yoshihiro Nakano, Komaki (JP); Yoshinori Hibino, Kasugai (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 102 days.

(21) Appl. No.: 15/787,984

(22) Filed: Oct. 19, 2017

(65) Prior Publication Data
US 2018/0112572 A1 Apr. 26, 2018

(30) Foreign Application Priority Data
Oct. 20, 2016 (JP) .................. 2016-206020

(51) Int. Cl.
*F01N 9/00* (2006.01)
*F01N 3/20* (2006.01)
(Continued)

(52) U.S. Cl.
CPC ............ *F01N 3/208* (2013.01); *F01N 3/021* (2013.01); *F01N 3/035* (2013.01); *F01N 3/0814* (2013.01); *F01N 3/0842* (2013.01); *F01N 9/002* (2013.01); *F01N 11/00* (2013.01); *F01N 11/007* (2013.01); *F01N 2550/05* (2013.01); *F01N 2560/021* (2013.01); *F01N 2560/026* (2013.01); *F01N 2610/02* (2013.01); *F01N 2900/0416* (2013.01); *F01N 2900/1402* (2013.01); *Y02T 10/24* (2013.01); *Y02T 10/47* (2013.01)

(58) Field of Classification Search
CPC .... F01N 9/002; F01N 11/00; F01N 2560/021; F01N 2560/026
See application file for complete search history.

(56) References Cited

U.S. PATENT DOCUMENTS

2007/0079597 A1* 4/2007 Wang ..................... F01N 3/2066
60/277
2019/0101075 A1* 4/2019 Zhang ..................... F01N 9/002

FOREIGN PATENT DOCUMENTS

JP          2014-224504 A    12/2014

* cited by examiner

*Primary Examiner* — Jonathan R Matthias
(74) *Attorney, Agent, or Firm* — Sughrue Mion, PLLC

(57) ABSTRACT

A concentration calculation apparatus, system and method which can compute a correction value for correcting an ammonia sensor output at a timing other than the time of fuel cut. A multi-gas sensor control apparatus (9) of a urea SCR system (1) begins recording (storing) a downstream NOx output value Sn and downstream ammonia output value Sa detected by a multi-gas sensor (8) (S120) when the control apparatus determines that a DPF regeneration process is currently being performed (an affirmative determination in S110). The apparatus (9) computes a downstream ammonia converted value Ca using a peak value of the downstream NOx output value Sn (S170), and calculates a Gain correction coefficient based on a comparison of the downstream converted value Ca and the output value Sa (S180). As a result, the Gain correction coefficient can be computed in accordance with the state of the ammonia detection section (202).

9 Claims, 7 Drawing Sheets

(51) Int. Cl.
*F01N 3/035* (2006.01)
*F01N 11/00* (2006.01)
*F01N 3/08* (2006.01)
*F01N 3/021* (2006.01)

CONCENTRATION CALCULATION APPARATUS, CONCENTRATION CALCULATION SYSTEM, AND CONCENTRATION CALCULATION METHOD

BACKGROUND OF THE INVENTION

1. Field of the Invention

The present invention relates to a concentration calculation apparatus, a concentration calculation system, and a concentration calculation method which calculate the concentration of ammonia discharged from a selective reduction catalyst.

2. Description of the Related Art

In a conventional system for purifying exhaust gas discharged from an internal combustion engine and containing NOx, an SCR (selective catalytic reduction) catalyst is disposed in an exhaust pipe of the internal combustion engine, and urea is supplied to the SCR catalyst as a reducing agent.

Such a system includes an NOx sensor for detecting NOx flowing out of the SCR catalyst, and an ammonia sensor for detecting ammonia flowing out of the SCR catalyst. A technique has been known for correcting the output of the ammonia sensor by comparing the output of the NOx sensor (NOx sensor output) and the output of the ammonia sensor (ammonia sensor output) (see, for example, Patent Document 1).

In the above-described technique, when the supply of fuel to the internal combustion engine is cut (hereinafter referred to as "the time of fuel cut"), urea (ammonia) is injected, and a correction value for correcting the output of the ammonia sensor is computed through use of the NOx sensor output and the ammonia sensor output for the injected urea (ammonia).

In the above-described technique, since the correction value is computed on the assumption that the exhaust gas contains no NOx, the computation of the correction value is performed at the time of fuel cut.

[Patent Document 1] Japanese Patent Application Laid-Open (kokai) No. 2014-224504

3. Problems to be Solved by the Invention

However, the above-described technique, in which the computation of the correction value is performed on the assumption that the exhaust gas contains no NOx, may fail to properly compute the correction value in the case where, due to the configuration of the internal combustion engine, NOx remains in the exhaust gas even at the time of fuel cut.

For example, in the case of an internal combustion engine including an exhaust gas recirculation apparatus (EGR), even at the time of fuel cut, NOx may reach a region where the ammonia sensor is disposed. In such a case, there is a possibility that the sensor output varies due to the influence of the NOx, and the correction value for the ammonia sensor cannot be properly computed.

SUMMARY OF THE INVENTION

It is therefore an object of the present invention to provide a concentration calculation apparatus, a concentration calculation system, and a concentration calculation method which can compute a correction value for correcting the output of the ammonia sensor at a timing other than the time of fuel cut of an internal combustion engine.

The above object has been achieved, in a first aspect of the present invention, by providing (1) a concentration calculation apparatus for calculating a downstream ammonia concentration of a purification system which purifies exhaust gas discharged from an internal combustion engine and containing NOx. The concentration calculation apparatus calculates the downstream ammonia concentration based on a first sensor output value which is an output of a first sensor, and includes a correction value computation section.

The purification system includes a selective reduction catalyst, a reducing agent supply section, a filter section, the first sensor, and a second sensor.

The selective reduction catalyst is disposed in an exhaust pipe of the internal combustion engine so as to purify the exhaust gas discharged from the internal combustion engine and containing NOx. The reducing agent supply section supplies a reducing agent to the selective reduction catalyst. The filter section is disposed in the exhaust pipe so as to remove particulate matter from the exhaust gas. The first sensor detects the downstream ammonia concentration which is the concentration of ammonia contained in the exhaust gas having passed through the selective reduction catalyst and the filter section. The second sensor detects a specific component concentration which is the concentration of a specific component which is contained in the exhaust gas having passed through the selective reduction catalyst and the filter section and which differs from ammonia. The second sensor has an output value which changes not only with a change in the specific component concentration but also with a change in the downstream ammonia concentration.

The correction value computation section computes a correction value for correcting the first sensor output value or the downstream ammonia concentration, through use of the first sensor output value and the second sensor output value during a regeneration process for the filter section.

In the purification system, the exhaust gas may be brought into a high temperature state so as to regenerate the filter section which has collected particulate matter (process of removing the particulate matter through combustion). Since the temperature of the exhaust gas is high during such a filter regeneration process, not only the filter section, but also the selective reduction catalyst is brought into a high temperature state. When the selective reduction catalyst is brought into a high temperature state as described above, ammonia adsorbed by the selective reduction catalyst is released, and the released ammonia flows to a region downstream of the selective reduction catalyst. At that time, due to the influence of the ammonia, the first sensor output value of the first sensor changes, and the second sensor output value of the second sensor also changes. Notably, when the first sensor output value changes, the downstream ammonia concentration calculated based on the first sensor output value also changes.

In the concentration calculation apparatus, the correction value computation section computes the correction value for correcting the first sensor output value or the downstream ammonia concentration, through use of the first sensor output value and the second sensor output value during the regeneration process for the filter section.

Use of the first sensor output value and the second sensor output value during the regeneration process for the filter section as described above allows a determination as to whether or not the first sensor output value and the downstream ammonia concentration have changed due to the influence of the state (deterioration, poisoning, etc.) of the first sensor. For example, the correction value for correcting the first sensor output value or the downstream ammonia concentration can be computed in accordance with the state of the first sensor through use of the result of comparison between the first sensor output value and the second sensor output value during the regeneration process for the filter section.

In this concentration calculation apparatus, ammonia released from the selective reduction catalyst in the high temperature state is used at the time of computing the correction value. Therefore, a special process (process of injecting a reducing agent (urea, ammonia, or the like)) for computing the correction value becomes unnecessary. Also, the concentration calculation apparatus can compute the correction value at an arbitrary timing if the selective reduction catalyst is in the high temperature state. Therefore, as compared with the case where the timing of computation of the correction value is limited to the time of fuel cut, it becomes easier to select a timing at which the specific component which influences the second sensor output value does not exist in the exhaust pipe.

Therefore, according to the above concentration calculation apparatus, since the timing of computation of the correction value is not limited to the time of fuel cut, the degree of complication associated with the computation of the correction value is mitigated. Also, according to this concentration calculation apparatus, the frequency of computation (updating) of the correction value increases. Therefore, when the first sensor output value and the downstream ammonia concentration have changed due to the state (deterioration, poisoning, etc.) of the first sensor, the first sensor output value and the downstream ammonia concentration can be quickly corrected, whereby a decrease in the accuracy in detecting the ammonia concentration can be prevented.

Further, according to the above concentration calculation apparatus, ammonia is supplied from the selective reduction catalyst at the time of computing the correction value. Therefore, a special process (process of injecting a reducing agent (urea, ammonia, or the like)) for computing the correction value becomes unnecessary. Thus, it is possible to prevent the apparatus structure from becoming complex.

In a preferred embodiment (2), the above-described concentration calculation apparatus further comprises a first sensor output detection section, a second sensor output detection section, and a converted value computation section for computing at least one of an output converted value and a concentration converted value, wherein the correction value computation section computes the correction value based on the result of comparison between the first sensor output value and the output converted value or the result of comparison between the downstream ammonia concentration and the concentration converted value.

The first sensor output detection section detects the first sensor output value during the regeneration process for the filter section. The second sensor output detection section detects the second sensor output value during the regeneration process for the filter section. The converted value computation section computes at least one of the output converted value which is a converted value of the first sensor output value and the concentration converted value which is a converted value of the downstream ammonia concentration through use of the second sensor output value.

The output converted value and the concentration converted value obtained as a result of the computation performed through use of the second sensor output value during the regeneration process for the filter section change due to the influence of ammonia produced during the filter regeneration. Therefore, the result of comparison between the first sensor output value and the output converted value or the result of comparison between the downstream ammonia concentration and the concentration converted value changes in accordance with the state (deterioration, poisoning, etc.) of the first sensor.

Namely, the correction value for correcting the first sensor output value or the downstream ammonia concentration can be computed by comparing the first sensor output value and the output converted value or by comparing the downstream ammonia concentration and the concentration converted value.

Therefore, according to the above concentration calculation apparatus, the correction value for correcting the first sensor output value or the downstream ammonia concentration can be computed in accordance with the state (deterioration, poisoning, etc.) of the first sensor.

In another preferred embodiment (3), the concentration calculation apparatus (1) or (2) above further comprises an output value determination section for determining whether or not the second sensor output value during the regeneration process for the filter section is equal to or greater than a predetermined threshold value, wherein the correction value computation section computes the correction value when the output value determination section determines that the second sensor output value is equal to or greater than the threshold value and does not compute the correction value when the output value determination section determines that the second sensor output value is not equal to or greater than the threshold value.

In the case where the second sensor output value during the filter regeneration is equal to or greater than the threshold value, the amount of ammonia produced during the filter regeneration is equal to or greater than a certain level. In such a case, the degree of influence of the state (deterioration, poisoning, etc.) of the first sensor on the result of comparing the first sensor output value and the second sensor output value becomes equal to or greater than a certain level. Namely, in the case where the second sensor output value during the filter regeneration is equal to or greater than the threshold value, the accuracy in determining the state (deterioration, poisoning, etc.) of the first sensor increases, and a more accurate correction value can be computed.

In other words, in the case where the second sensor output value during the filter regeneration is equal to or greater than the threshold value, the concentration calculation apparatus can determine that ammonia has reached the first sensor and the second sensor, and the correction value computed through use of the first sensor output value and the second sensor output value at that time becomes an accurate value which reflects the state (deterioration, poisoning, etc.) of the first sensor.

Meanwhile, in the case where the second sensor output value during the filter regeneration is not equal to or greater than the threshold value, there is a possibility that ammonia has not yet reached at least one of the first sensor and the second sensor, and the correction value computed through use of the first sensor output value and the second sensor output value at that time is not a value which reflects the state (deterioration, poisoning, etc.) of the first sensor.

Therefore, by employing the configuration of selectively computing the correction value based on the result of the determination as to whether or not the second sensor output value during the filter regeneration is equal to or greater than the threshold value, a proper correction value which reflects the state (deterioration, poisoning, etc.) of the first sensor can be computed unlike the case where the correction value is computed at all times.

Therefore, according to the above concentration calculation apparatus, the setting of the correction value to an improper value is prevented. Thus, a decrease in the accuracy in detecting the ammonia concentration can be prevented.

In yet another preferred embodiment (4) of the concentration calculation apparatus of any of (1) to (3) above, the first sensor is an ammonia sensor, and the second sensor is an NOx sensor.

Namely, since an NOx sensor output value output from the NOx sensor changes with not only a change in the NOx concentration but also a change in the ammonia concentration, the NOx sensor can be used as the second sensor.

Notably, the second sensor may be an ammonia sensor for correction which differs from the first sensor. Such an ammonia sensor for correction has characteristics such that its sensor output value changes not only with a change in the ammonia concentration, but also with a change in the NOx concentration.

In yet another preferred embodiment (5) of the concentration calculation apparatus (4) above, the first sensor is an ammonia sensor and the second sensor is an NOx sensor, and the ammonia sensor is provided in the form of a multi-sensor in which the ammonia sensor is integrated with the NOx sensor.

Since the ammonia sensor and the NOx sensor are provided in the form of a multi-sensor, the respective gas detection positions of the two sensors are not remote from each other and coincide with each other. As a result, the ammonia sensor output value (first sensor output value) and the NOx sensor output value (second sensor output value) show changes in the exhaust gas in the same state.

When the correction value is computed through use of the ammonia sensor output value (first sensor output value) and the NOx sensor output value (second sensor output value) as described above, the correction value on which the state (deterioration, poisoning, etc.) of the ammonia sensor (the first sensor) is reflected can be obtained more accurately.

Therefore, according to the above concentration calculation apparatus, the correction value on which the state (deterioration, poisoning, etc.) of the ammonia senor (the first sensor) is reflected can be obtained more accurately. As a result, a decrease in the accuracy in detecting the ammonia concentration can be further prevented.

In a second aspect (6), the present invention provides a concentration calculation system which comprises the concentration calculation apparatus of any of (1) to (5) above, an ammonia sensor serving as the first sensor; and an NOx sensor serving as the second sensor.

According to the above concentration calculation system, the timing of computation of the correction value is not limited to the time of fuel cut as in the case of the above-described concentration calculation apparatus. Therefore, the degree of complication associated with the computation of the correction value is mitigated.

In another aspect (7), the present invention provides a concentration calculation method for calculating a downstream ammonia concentration of a purification system which purifies exhaust gas discharged from an internal combustion engine and containing NOx. The concentration calculation method calculates the downstream ammonia concentration based on a first sensor output value which is an output of a first sensor, and includes a correction value computation step.

The purification system includes a selective reduction catalyst, a reducing agent supply section, a filter section, the first sensor, and a second sensor.

The selective reduction catalyst is disposed in an exhaust pipe of the internal combustion engine so as to purify the exhaust gas discharged from the internal combustion engine and containing NOx. The reducing agent supply section supplies a reducing agent to the selective reduction catalyst. The filter section is disposed in the exhaust pipe so as to remove particulate matter from the exhaust gas. The first sensor detects the downstream ammonia concentration which is the concentration of ammonia contained in the exhaust gas having passed through the selective reduction catalyst and the filter section. The second sensor detects a specific component concentration which is the concentration of a specific component which is contained in the exhaust gas having passed through the selective reduction catalyst and the filter section and which differs from ammonia. The second sensor has an output value which changes not only with a change in the specific component concentration but also with a change in the downstream ammonia concentration.

In the correction value computation step, a correction value for correcting the first sensor output value or the downstream ammonia concentration is computed through use of the first sensor output value and the second sensor output value during a regeneration process for the filter section.

In the purification system, the exhaust gas may be brought into a high temperature state so as to regenerate the filter section having collected particulate matter (process of removing the particulate matter through combustion). Since the temperature of the exhaust gas is high during such a filter regeneration process, not only the filter section, but also the selective reduction catalyst is brought into a high temperature state. When the selective reduction catalyst is brought into a high temperature state as described above, ammonia adsorbed by the selective reduction catalyst is released, and the released ammonia flows to a region downstream of the selective reduction catalyst. At that time, due to the influence of the ammonia, the first sensor output value of the first sensor changes, and the second sensor output value of the second sensor also changes. Notably, when the first sensor output value changes, the downstream ammonia concentration calculated based on the first sensor output value also changes.

In the concentration calculation method, the correction value computation section computes the correction value for correcting the first sensor output value or the downstream ammonia concentration, through use of the first sensor output value and the second sensor output value during the regeneration process for the filter section.

Use of the first sensor output value and the second sensor output value during the regeneration process for the filter section as described above allows a determination as to whether or not the first sensor output value and the downstream ammonia concentration have changed due to the influence of the state (deterioration, poisoning, etc.) of the first sensor. For example, the correction value for correcting the first sensor output value or the downstream ammonia concentration can be computed by comparing the first sensor output value and the second sensor output value during the regeneration process for the filter section.

In this concentration calculation method, ammonia released from the selective reduction catalyst in the high temperature state is used at the time of computing the correction value. Therefore, a special process (process of injecting a reducing agent (urea, ammonia, or the like)) for computing the correction value becomes unnecessary. Also, in this concentration calculation method, the correction value can be computed at an arbitrary timing if the selective reduction catalyst is in the high temperature state. Therefore, as compared with the case where the timing of computation of the correction value is limited to the time of fuel cut, it becomes easier to select a timing at which the specific component which influences the second sensor output value does not exist in the exhaust pipe.

Therefore, according to this concentration calculation method, since the timing of computation of the correction value is not limited to the time of fuel cut, the degree of complication associated with the computation of the correction value is mitigated. Also, according to this concentration calculation method, the frequency of computation (updating) of the correction value increases. Therefore, when the first sensor output value and the downstream ammonia concentration have changed due to the state (deterioration, poisoning, etc.) of the first sensor, the first sensor output value and the downstream ammonia concentration can be quickly corrected, whereby a decrease in the accuracy in detecting the ammonia concentration can be prevented.

Further, according to the above concentration calculation method, ammonia is supplied from the selective reduction catalyst at the time of computing the correction value. Therefore, a special process (process of injecting a reducing agent (urea, ammonia, or the like)) for computing the correction value becomes unnecessary. Thus, it is possible to prevent the concentration calculation method from becoming complex.

[Effects of the Invention]

According to the concentration calculation apparatus and the concentration calculation method of the present invention, the timing of computation of the correction value is not limited to the time of fuel cut. Therefore, the degree of complication associated with computing the correction value is mitigated. Also, according to the concentration calculation apparatus and the concentration calculation method, the frequency of computing (updating) the correction value increases. Therefore, when the first sensor output value and the downstream ammonia concentration have changed due to the state (deterioration, poisoning, etc.) of the first sensor, the first sensor output value and the downstream ammonia concentration can be quickly corrected, whereby a decrease in the accuracy in detecting the ammonia concentration can be prevented.

DESCRIPTION OF REFERENCE NUMERALS

Figure 1:
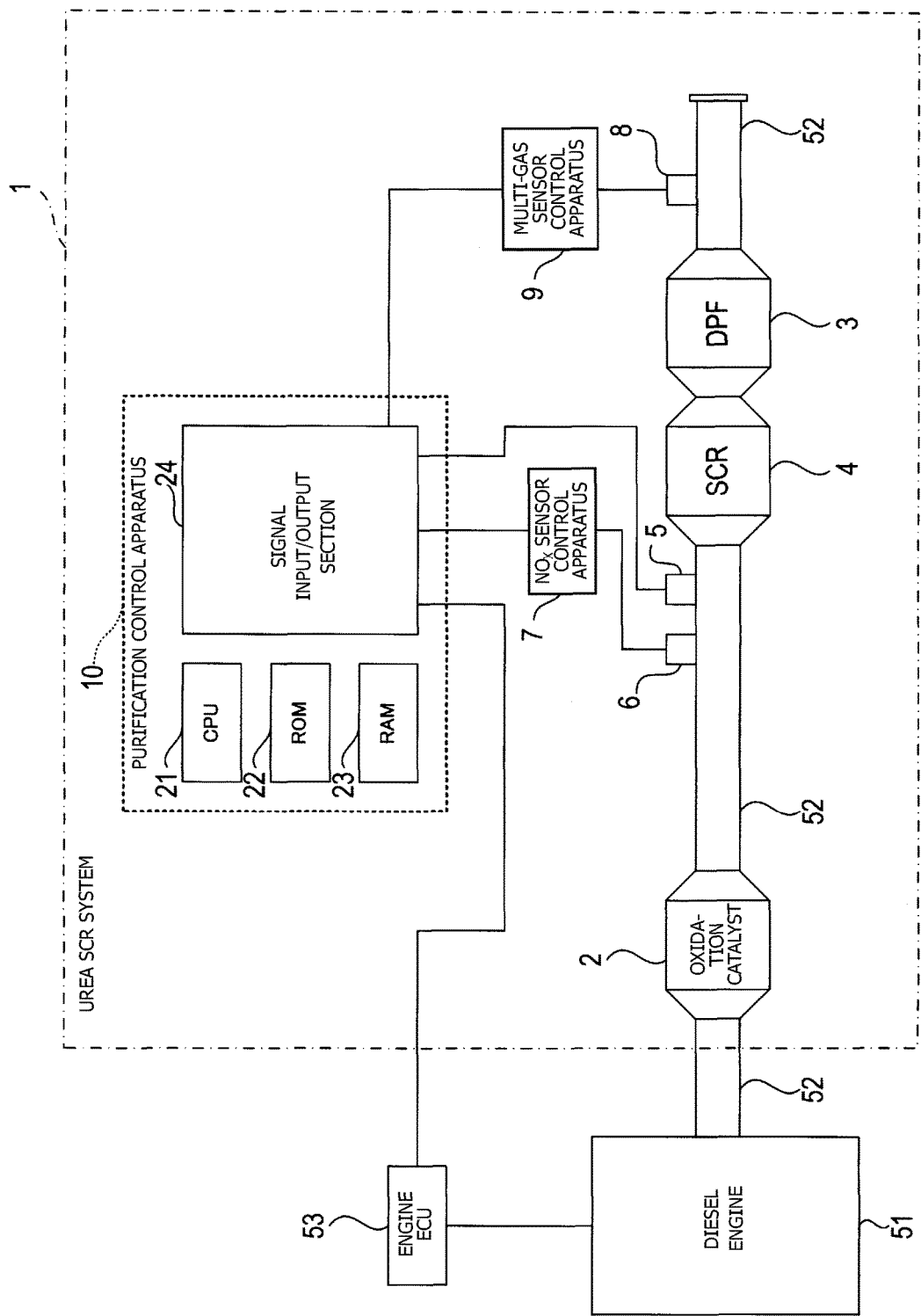
FIG. 1 is a diagram schematically showing the configuration of a urea SCR system.

Reference numerals used to identify various features in the drawings include the following.

1 . . . urea SCR system, 2 . . . oxidation catalyst, 4 . . . SCR catalyst, 5 . . . urea water injector, 6 . . . upstream NOx sensor, 7 . . . NOx sensor control apparatus, 8 . . . multi-gas sensor, 9 . . . multi-gas sensor control apparatus, 10 . . . purification control apparatus, 51 . . . internal combustion engine (diesel engine), 53 . . . electronic control unit (engine ECU), 190 . . . microcomputer, 201 . . . NOx detection section, 202 . . . ammonia detection section, 220 . . . control circuit, 230 . . . microcomputer, 301 . . . second urea SCR system, 302 . . . lean NOx trap (LNT), 311 . . . ammonia sensor, 313 . . . NOx sensor.

DETAILED DESCRIPTION OF THE PREFERRED EMBODIMENTS

Embodiments to which the present invention is applied will be described in greater detail with reference to the drawings. However, the present invention should not be construed as being limited thereto.

1. First Embodiment

[1-1. Overall Configuration]

A first embodiment of the present invention will now be described with reference to the drawings.

As shown in FIG. 1, a urea SCR (selective catalytic reduction) system 1 of the embodiment to which the present invention is applied includes an oxidation catalyst 2, a DPF (diesel particulate filter) 3, an SCR catalyst 4, a urea water injector 5, an upstream NOx sensor 6, an NOx sensor control apparatus 7, a multi-gas sensor 8, a multi-gas sensor control apparatus 9, and a purification control apparatus 10.

The urea SCR system 1 is an example of a purification system for purifying exhaust gas discharged from an internal combustion engine 51 (hereinafter, also referred to as the "diesel engine 51") and containing NOx.

The oxidation catalyst 2 receives, through an exhaust pipe 52 of the diesel engine 51, the exhaust gas discharged from the diesel engine 51, and oxidizes nitrogen oxide (NO) of NOx contained in the received exhaust gas to thereby produce nitrogen dioxide ($NO_2$).

The SCR catalyst 4 hydrolyzes the urea supplied from the upstream side into ammonia, receives the exhaust gas discharged from the oxidation catalyst 2 through the exhaust pipe 52, and acts as a catalyst so as to reduce NOx in the received exhaust gas through use of the resultant ammonia to thereby convert NOx into nitrogen gas and water vapor. As a result, the SCR catalyst 4 discharges the exhaust gas whose NOx has been reduced. Namely, the SCR catalyst 4 is disposed in the exhaust pipe 52 so as to purify the exhaust gas discharged from the diesel engine 51 and containing NOx.

The DPF 3 receives, through the exhaust pipe 52, the exhaust gas discharged from the SCR catalyst 4, and removes particulate matter from the received exhaust gas.

Namely, the DPF 3 is disposed in the exhaust pipe 52 so as to collect and remove particulate matter from the exhaust gas.

The urea water injector 5 is disposed on the exhaust pipe 52 to be located between the oxidation catalyst 2 and the SCR catalyst 4 and injects urea water into the exhaust gas. The injected urea is hydrolyzed under high temperature, whereby ammonia gas is produced. This ammonia gas is used as a reducing agent for NOx reduction. Namely, the urea water injector 5 is provided so as to supply urea water, as a reducing agent, to the SCR catalyst 4.

The upstream NOx sensor 6 is disposed on the exhaust pipe 52 to be located between the oxidation catalyst 2 and the SCR catalyst 4 and detects the concentration of NOx contained in the exhaust gas discharged from the oxidation catalyst 2.

The NOx sensor control apparatus 7 controls the upstream NOx sensor 6 and computes the concentration of NOx contained in the exhaust gas discharged from the oxidation catalyst 2 (hereinafter also referred to as "upstream NOx concentration") based on the result of detection by the upstream NOx sensor 6. The NOx sensor control apparatus 7 is configured to exchange data with the purification control apparatus 10 through a communication line, and sends to the purification control apparatus 10 upstream NOx concentration information representing the upstream NOx concentration.

The multi-gas sensor 8 is disposed on the exhaust pipe 52 to be located on the downstream side of the DPF 3 and detects the NOx concentration and ammonia concentration in the exhaust gas discharged from the DPF 3.

The multi-gas sensor control apparatus 9 controls the multi-gas sensor 8 and calculates, based on the result of detection by the multi-gas sensor 8, the NOx concentration (hereinafter also referred to as the "downstream NOx concentration"), oxygen concentration (hereinafter also referred to as the "downstream oxygen concentration"), and ammonia concentration (hereinafter also referred to as the "downstream ammonia concentration") in the exhaust gas discharged from the DPF 3. The multi-gas sensor control apparatus 9 is configured to exchange data with the purification control apparatus 10 through a communication line, and sends to the purification control apparatus 10 downstream NOx concentration information representing the downstream NOx concentration and downstream ammonia concentration information representing the downstream ammonia concentration.

The purification control apparatus 10 is mainly composed of a microcomputer including a CPU 21, a ROM 22, a RAM 23, a signal input/output section 24, etc. The urea water injector 5, the NOx sensor control apparatus 7, and the multi-gas sensor control apparatus 9 are connected to the signal input/output section 24.

The purification control apparatus 10 is configured to exchange data with the NOx sensor control apparatus 7 and the multi-gas sensor control apparatus 9 through the communication lines. Further, the purification control apparatus 10 is configured to exchange data, through a communication line, with an electronic control unit 53 for controlling the diesel engine 51. In the following description, the electronic control unit 53 will be referred to as the engine ECU (electronic control unit) 53.

[1-2. Upstream NOx Sensor]

Figure 2:
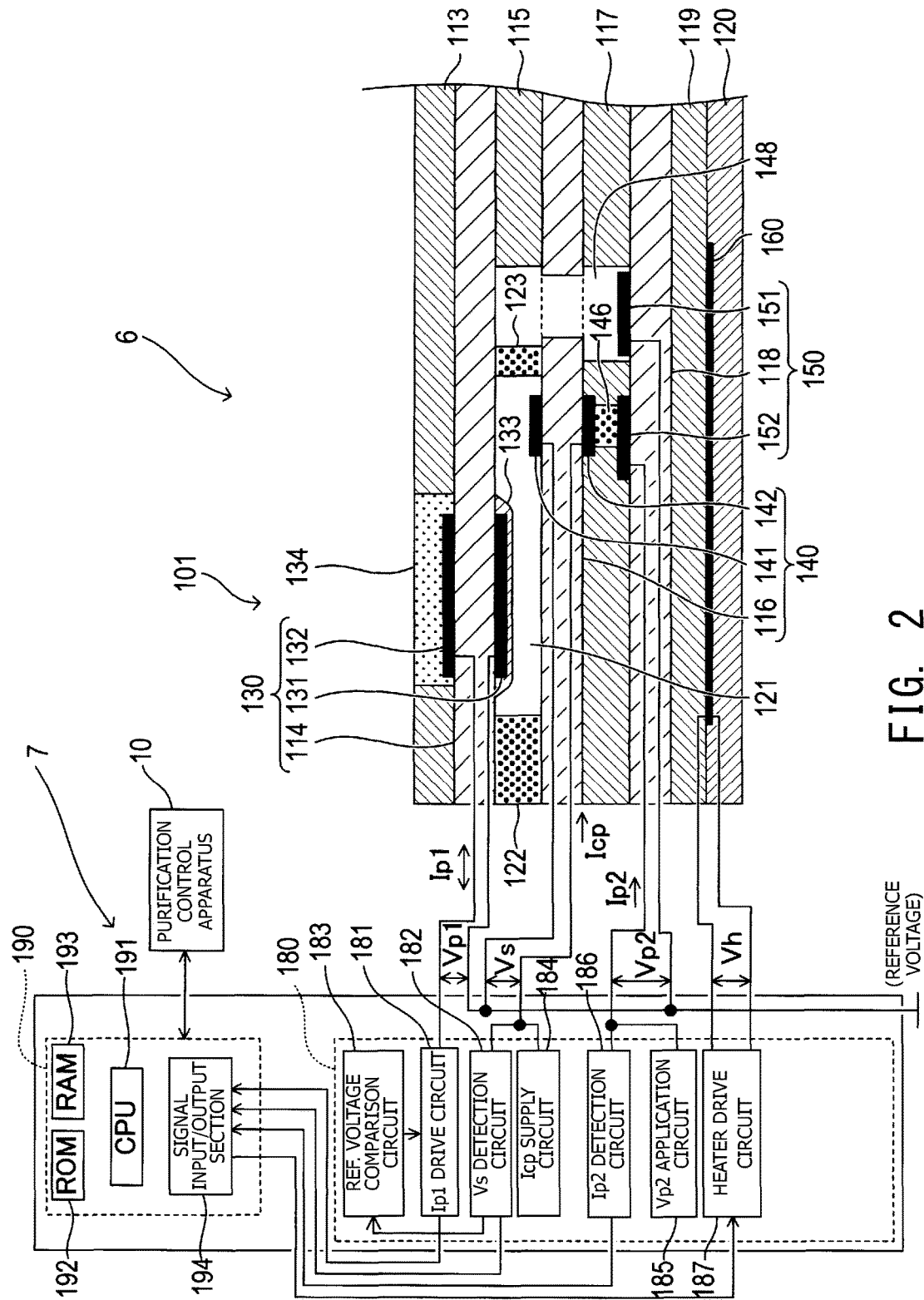
FIG. 2 is an illustration schematically showing the structure of an upstream NOx sensor and the configuration of an NOx sensor control apparatus.

As shown in FIG. 2, the upstream NOx sensor 6 is formed by sequentially stacking an insulating layer 113, a solid electrolyte layer 114, an insulating layer 115, a solid electrolyte layer 116, an insulating layer 117, a solid electrolyte layer 118, an insulating layer 119, and an insulating layer 120. The insulating layers 113, 115, 117, 119, and 120 are formed mainly of alumina. The solid electrolyte layers 114, 116, and 118 are formed mainly of zirconia having oxygen ion conductivity.

The upstream NOx sensor 6 has a first measurement chamber 121 formed between the solid electrolyte layer 114 and the solid electrolyte layer 116. The upstream NOx sensor 6 has an NOx detection section 101 on the forward end side. The NOx detection section 101 is configured to introduce exhaust gas into the first measurement chamber 121 from the outside through a diffusion resistor 122. The diffusion resistor 122 is disposed between the solid electrolyte layer 114 and the solid electrolyte layer 116 to be located adjacent to the first measurement chamber 121. The diffusion resistor 122 is formed of a porous material such as alumina.

The upstream NOx sensor 6 has a second measurement chamber 148. The second measurement chamber 148 is formed between the solid electrolyte layer 114 and the solid electrolyte layer 118 such that the second measurement chamber 148 penetrates the insulating layer 115, the solid electrolyte layer 116, and the insulating layer 117. The upstream NOx sensor 6 is configured such that the exhaust gas discharged from the first measurement chamber 121 through a diffusion resistor 123 is introduced into the second measurement chamber 148. The diffusion resistor 123 is disposed between the solid electrolyte layer 114 and the solid electrolyte layer 116 in a region located adjacent to the first measurement chamber 121 and on the side opposite the diffusion resistor 122. The diffusion resistor 123 is formed of a porous material such as alumina.

The upstream NOx sensor 6 includes a first pumping cell 130. The first pumping cell 130 includes the solid electrolyte layer 114 and pumping electrodes 131 and 132. The pumping electrodes 131 and 132 are formed mainly of platinum. The pumping electrode 131 is disposed on a surface of the solid electrolyte layer 114, which surface is exposed to the first measurement chamber 121. A surface of the pumping electrode 131 on the first measurement chamber 121 side is covered with a protection layer 133 formed of a porous material. The pumping electrode 132 is disposed on a surface of the solid electrolyte layer 114, which surface is located on the side of the solid electrolyte layer 114 opposite the pumping electrode 131. The insulating layer 113 is removed from a region in which the pumping electrode 132 is disposed and from a region around the pumping electrode 132, and the resulting space is filled with a porous material 134 instead of the insulating layer 113. The porous material 134 allows gas (oxygen) migration between the pumping electrode 132 and the outside.

The upstream NOx sensor 6 includes an oxygen concentration detection cell 140. The oxygen concentration detection cell 140 includes the solid electrolyte layer 116, a detection electrode 141, and a reference electrode 142. The detection electrode 141 and the reference electrode 142 are formed mainly of platinum. The detection electrode 141 is disposed on a surface of the solid electrolyte layer 116, which surface is exposed to the first measurement chamber 121, such that within the first measurement chamber 121, the detection electrode 141 is located on the downstream side of the pumping electrode 131 (i.e., the side closer to the diffusion resistor 123 than the diffusion resistor 122). The reference electrode 142 is disposed on a surface of the solid electrolyte layer 116, which surface is located on the side of the electrolyte layer 116 opposite the detection electrode 141.

The upstream NOx sensor 6 includes a reference oxygen chamber 146. The reference oxygen chamber 146 is formed between the solid electrolyte layer 116 and the solid electrolyte layer 118 such that the reference electrode 142 is exposed to the interior of the reference oxygen chamber 146. The interior of the reference oxygen chamber 146 is filled with a porous material.

The upstream NOx sensor 6 includes a second pumping cell 150. The second pumping cell 150 includes the solid electrolyte layer 118 and pumping electrodes 151 and 152. The pumping electrodes 151 and 152 are formed mainly of platinum. The pumping electrode 151 is disposed on a surface of the solid electrolyte layer 118, which surface is exposed to the second measurement chamber 148. The pumping electrode 152 is disposed on a surface of the solid electrolyte layer 118, which surface is located on the side of the reference oxygen chamber 146 opposite the reference electrode 142.

The upstream NOx sensor 6 includes a heater 160. The heater 160 is a heat-generating resistor that is formed mainly of platinum and generates heat when energized and is disposed between the insulating layers 119 and 120.

The NOx sensor control apparatus 7 includes a control circuit 180 and a microcomputer 190.

The control circuit 180 is an analog circuit disposed on a circuit board. The control circuit 180 includes an Ip1 drive circuit 181, a Vs detection circuit 182, a reference voltage comparison circuit 183, an Icp supply circuit 184, a Vp2 application circuit 185, an Ip2 detection circuit 186, and a heater drive circuit 187.

The pumping electrode 131, the detection electrode 141, and the pumping electrode 151 are connected to a reference potential. The pumping electrode 132 is connected to the Ip1 drive circuit 181. The reference electrode 142 is connected to the Vs detection circuit 182 and the Icp supply circuit 184. The pumping electrode 152 is connected to the Vp2 application circuit 185 and the Ip2 detection circuit 186. The heater 160 is connected to the heater drive circuit 187.

The Ip1 drive circuit 181 supplies a first pumping current Ip1 between the pumping electrode 131 and the pumping electrode 132 and detects the supplied first pumping current Ip1.

The Vs detection circuit 182 detects the voltage Vs between the detection electrode 141 and the reference electrode 142 and outputs the detection result to the reference voltage comparison circuit 183.

The reference voltage comparison circuit 183 compares a reference voltage (e.g., 425 mV) with the output from the Vs detection circuit 182 (the voltage Vs) and outputs the comparison result to the Ip1 drive circuit 181. The Ip1 drive circuit 181 controls the direction and magnitude of the first pumping current Ip1 such that the voltage Vs becomes equal to the reference voltage to thereby adjust the concentration of oxygen in the first measurement chamber 121 to a predetermined level at which decomposition of NOx does not occur.

The Icp supply circuit 184 causes a weak current Icp to flow between the detection electrode 141 and the reference electrode 142. As a result, oxygen is fed from the first measurement chamber 121 to the reference oxygen chamber 146 through the solid electrolyte layer 116, whereby the concentration of oxygen in the reference oxygen chamber 146 is set to be a predetermined oxygen concentration serving as a reference.

The Vp2 application circuit 185 applies a constant voltage Vp2 (e.g., 450 mV) between the pumping electrode 151 and the pumping electrode 152. As a result, in the second measurement chamber 148, NOx is dissociated (reduced) through the catalytic action of the pumping electrodes 151 and 152 of the second pumping cell 150. The oxygen ions obtained as a result of the dissociation migrate in the solid electrolyte layer 118 between the pumping electrode 151 and the pumping electrode 152, so that a second pumping current Ip2 flows. The Ip2 detection circuit 186 detects the second pumping current Ip2.

The heater drive circuit 187 applies a positive voltage for heater energization to one end of the heater 160, which is a heat-generating resistor, and applies a negative voltage for heater energization to the other end of the heater 160 to thereby drive the heater 160.

The microcomputer 190 includes a CPU 191, a ROM 192, a RAM 193, and a signal input/output section 194.

The CPU 191 executes a process for controlling the upstream NOx sensor 6 according to a program stored in the ROM 192. The signal input/output section 194 is connected to the Ip1 drive circuit 181, the Vs detection circuit 182, the Ip2 detection circuit 186, and the heater drive circuit 187.

The CPU 191 adjusts the oxygen concentration within the first measurement chamber 121 by using the pumping operation of the first pumping cell 130 to thereby set the oxygen concentration within the second measurement chamber 148 to a concentration for NOx detection which allows NOx detection, and calculates the NOx concentration based on the current value of the second pumping current Ip2. Also, the CPU 191 outputs a driving signal to the heater drive circuit 187 through the signal input/output section 194 so as to control the heater 160.

[1-3. Multi-Gas Sensor]

Figure 3:
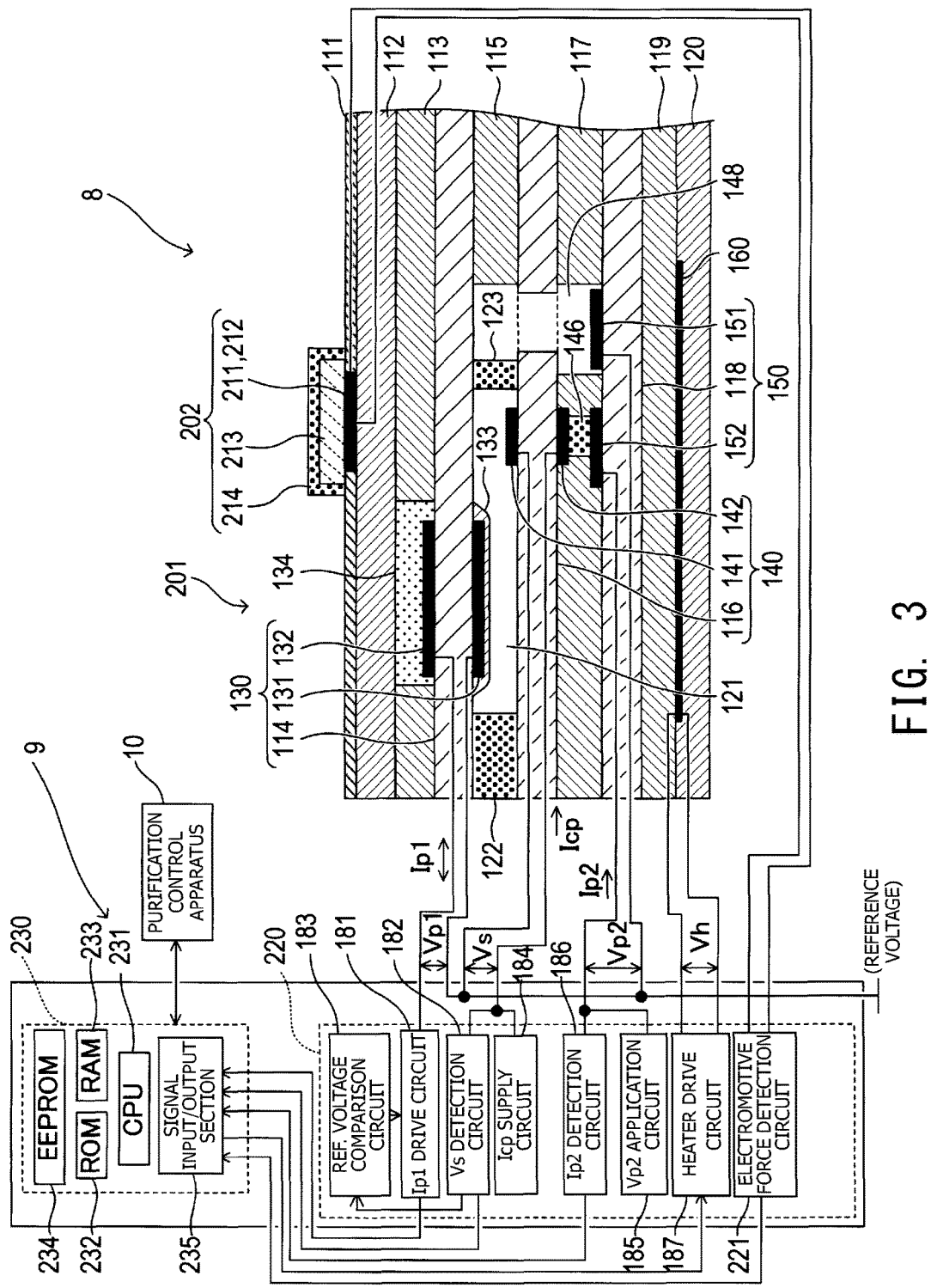
FIG. 3 is an illustration schematically showing the structure of a multi-gas sensor and the configuration of a multi-gas sensor control apparatus.

As shown in FIG. 3, the multi-gas sensor 8 includes an NOx detection section 201 and an ammonia detection section 202.

The NOx detection section 201 is identical to the upstream NOx sensor 6 except that a solid electrolyte layer 112 is stacked on the insulating layer 113 of the upstream NOx sensor 6 and an insulating layer 111 is stacked on the solid electrolyte layer 112. The insulating layer 111 is formed mainly of alumina. The solid electrolyte layer 112 is formed mainly of zirconia having oxygen ion conductivity.

Namely, the NOx detection section 201 of the multi-gas sensor 8 is provided so as to detect the concentration of NOx contained in the exhaust gas having passed through the SCR catalyst 4 and the DPF 3 (downstream NOx concentration).

The ammonia detection section 202 includes a detection electrode 211, a reference electrode 212, a selective reaction layer 213, and a diffusion layer 214.

Figure 4:
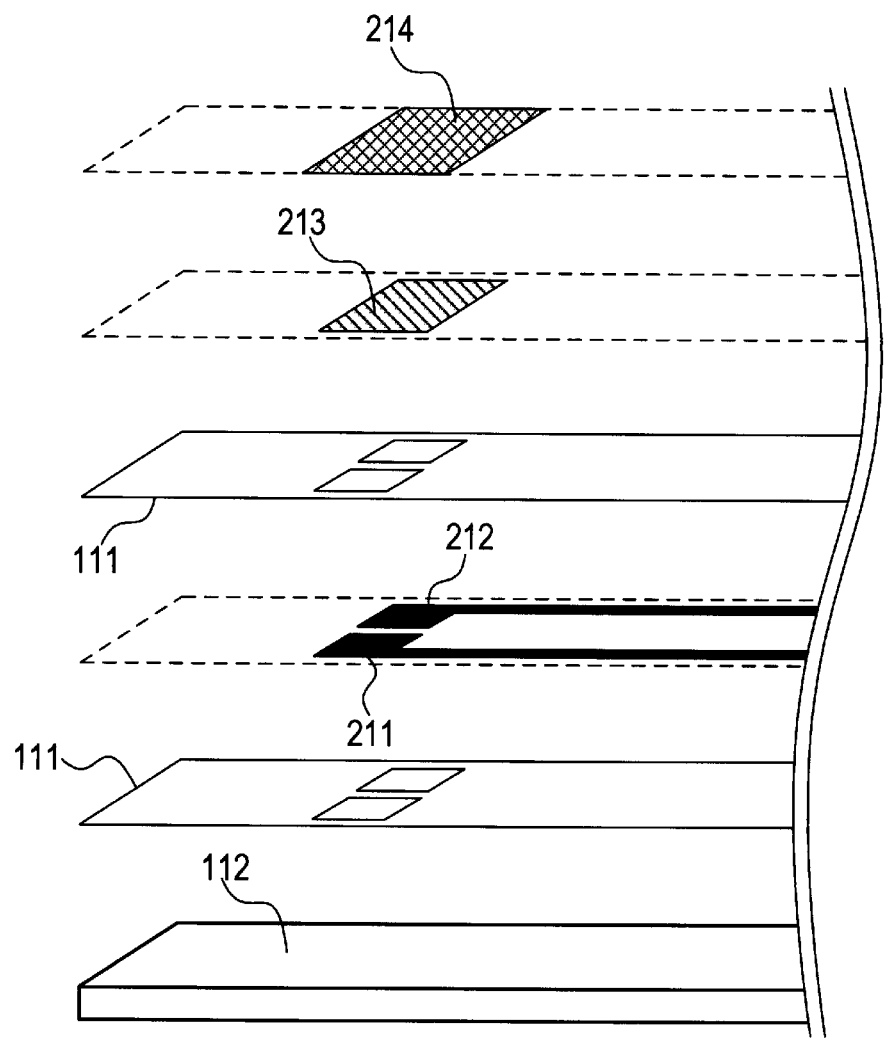
FIG. 4 is an exploded view schematically showing the structure of an ammonia detection section.

As shown in FIG. 4, the detection electrode 211 and the reference electrode 212 are disposed on the solid electrolyte layer 112 such that they are spaced apart from each other. The detection electrode 211 is formed of a material containing gold as a main component. The reference electrode 212 is formed of a material containing platinum as a main component. Since the detection electrode 211 has a higher ammonia reactivity than the reference electrode 212, an electromotive force is produced between the detection electrode 211 and the reference electrode 212.

The selective reaction layer 213 is formed mainly of metal oxide and is disposed to cover the detection electrode 211 and the reference electrode 212. The elective reaction layer 213 has a function of burning flammable gas components other than ammonia. Namely, by virtue of the selective reaction layer 213, the ammonia detection section 202 can detect ammonia contained in the exhaust gas without being adversely influenced by the flammable gas components.

The diffusion layer 214 is formed of a porous material and is disposed to cover the selective reaction layer 213. The diffusion layer 214 can adjust the diffusion speed of the exhaust gas flowing into the ammonia detection section 202 from the outside.

Namely, the ammonia detection section 202 of the multi-gas sensor 8 is provided so as to detect the concentration of ammonia contained in the exhaust gas which has passed through the SCR catalyst 4 and the DPF 3 (downstream ammonia concentration).

As shown in FIG. 3, the multi-gas sensor control apparatus 9 includes a control circuit 220 and a microcomputer 230.

The control circuit 220 differs from the control circuit 180 of the NOx sensor control apparatus 7 in the point that an electromotive force detection circuit 221 is added. The electromotive force detection circuit 221 detects the electromotive force generated between the detection electrode 211 and the reference electrode 212 (hereinafter referred to as "ammonia electromotive force EMF") and outputs a signal representing the detection result to the microcomputer 230.

The microcomputer 230 includes a CPU 231, a ROM 232, a RAM 233, an EEPROM 234, and a signal input/output section 235.

The CPU 231 executes a process for controlling the multi-gas sensor 8 according to a program stored in the ROM 232. The signal input/output section 235 is connected to the Ip1 drive circuit 181, the Vs detection circuit 182, the Ip2 detection circuit 186, the heater drive circuit 187, and the electromotive force detection circuit 221.

The CPU 231 calculates the NOx concentration in the same manner as the CPU 191 calculates the NOx concentration. Also, the CPU 231 calculates the oxygen concentration based on the flow direction and the current value of the first pumping current Ip1.

Also, the CPU 231 calculates the ammonia concentration by converting the ammonia electromotive force EMF to the ammonia concentration through use of an ammonia concentration conversion expression showing the relation between the ammonia electromotive force EMF and the ammonia concentration. The ammonia concentration conversion expression is a linear expression in which the ammonia electromotive force EMF is a variable and an offset value and a gradient are coefficients. Predetermined numerical values representing the offset value and gradient of the ammonia concentration conversion expression, respectively, are stored in the EEPROM 234.

Notably, the CPU 231 executes an ammonia output correction process for correcting the value of the detected ammonia electromotive force EMF (hereinafter also referred to as the "downstream ammonia output value Sa"). Specifically, the CPU 231 obtains a corrected downstream ammonia output value Sa by multiplying the detected downstream ammonia output value Sa by a Gain correction coefficient.

The Gain correction coefficient is a correction value determined in accordance with the state (deterioration, poisoning, etc.) of the ammonia detection section 202 of the multi-gas sensor 8. The value of the ammonia electromotive force EMF (the downstream ammonia output value Sa), which is the sensor output of the ammonia detection section 202, may change in accordance with the state of the ammonia detection section 202. Therefore, in order to reduce the influence of the change, a correction value determined in accordance with the state of the ammonia detection section 202 is set (stored) as the Gain correction coefficient.

Therefore, when the CPU 231 calculates the ammonia concentration through use of the value of the ammonia electromotive force EMF (the downstream ammonia output value Sa) and the ammonia concentration conversion expression, the CPU 231 uses the corrected downstream ammonia output value Sa as the downstream ammonia output value Sa.

Also, the CPU 231 outputs a driving signal to the heater drive circuit 187 through the signal input/output section 235 so as to control the heater 160.

The microcomputer 230 (the CPU 231) of the multi-gas sensor control apparatus 9 executes various types of processes, and executes a correction coefficient calculation process as one of the various types of processes.

[1-4. Correction Coefficient Calculation Process]

Next, the steps of the correction coefficient calculation process will be described. The CPU 231 starts the correction coefficient calculation process immediately after the microcomputer 230 of the multi-gas sensor control apparatus 9 is started.

Figure 5:
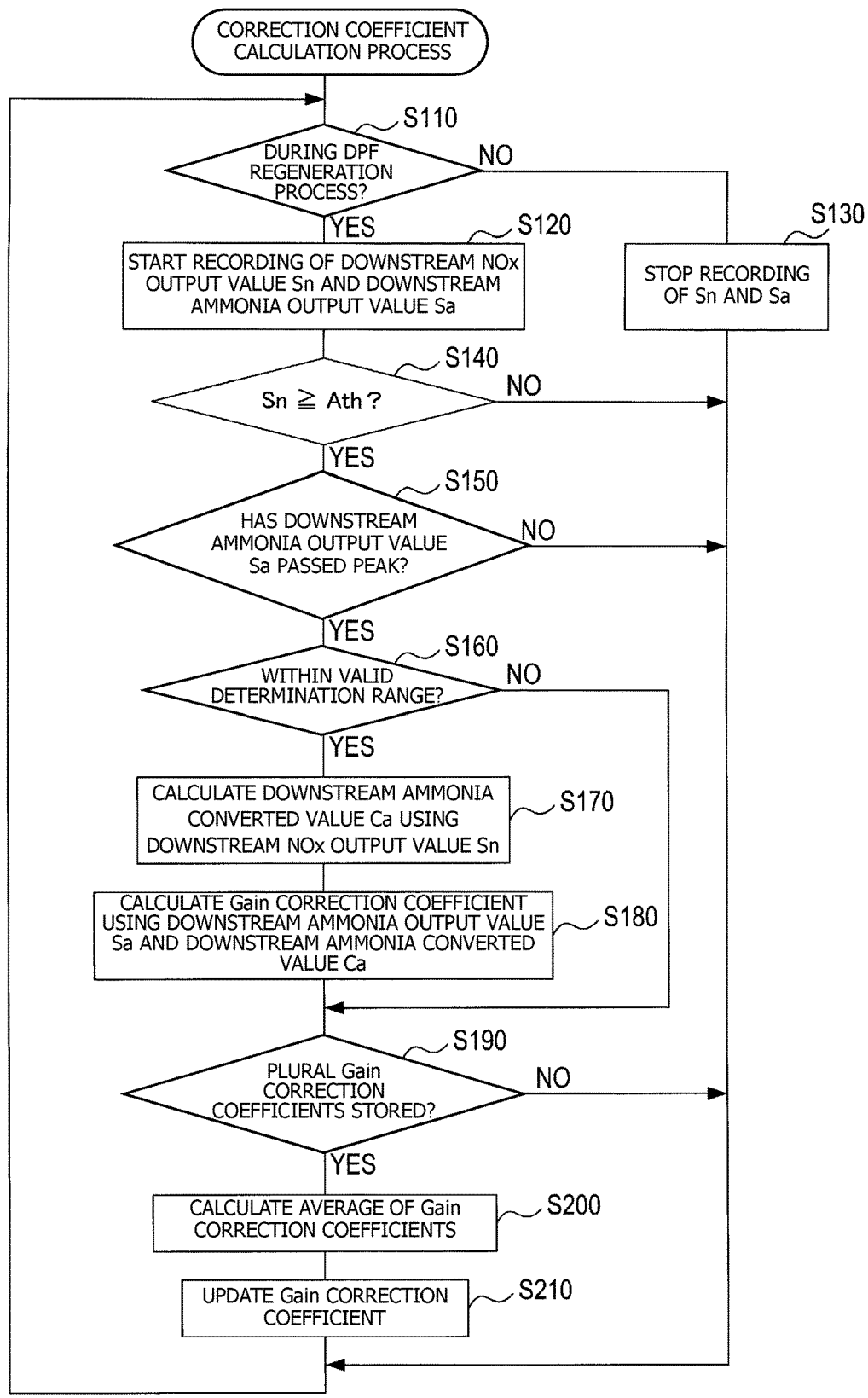
FIG. 5 is a flowchart showing the details of a correction coefficient calculation process of a first embodiment.

FIG. 5 is a flowchart showing the details of the correction coefficient calculation process.

When the correction coefficient calculation process is started, in S110 (S stands for "step"), the CPU 231 first determines whether or not a DPF regeneration process is currently being performed. When the CPU 231 makes an affirmative determination, the CPU 231 proceeds to S120. When the CPU 231 makes a negative determination, the CPU 231 proceeds to S130. Notably, in S110, the CPU 231 determines that the DPF regeneration process is currently being performed when a DPF regeneration signal received from the purification control apparatus 10 is in an on state, and determines that the DPF regeneration process is not currently performed when the DPF regeneration signal is in an off state.

The DPF regeneration signal is a signal representing whether or not the DPF regeneration process is currently being performed. When the DPF regeneration process is currently being performed, the voltage of the DPF regeneration signal becomes a high level (on state). When the DPF regeneration process is not currently being performed, the voltage of the DPF regeneration signal assumes a low level (off state). The DPF regeneration signal is transmitted from the engine ECU 53 to the purification control apparatus 10, and is further transmitted from the purification control apparatus 10 to the multi-gas sensor control apparatus 9.

The DPF regeneration process is one of various control processes executed by the engine ECU 53. The engine ECU 53 executing the DPF regeneration process performs a process of increasing the temperature of the exhaust gas by, for example, controlling the operation state of the internal combustion engine. As a result, the DPF 3 is brought into a high temperature state by the exhaust gas. Notably, the DPF regeneration process is a process of burning and removing the particulate matter collected by the DPF 3, by brining the DPF 3 into a high temperature state, so as to improve the particulate matter collection performance of the DPF 3, to thereby regenerate the DPF 3.

During a period during which such a DPF regeneration process is executed, since the exhaust gas has a high temperature, not only the DPF 3 but also the SCR catalyst 4 is brought into a high temperature state. In this case, ammonia adsorbed by the SCR catalyst 4 is released, and the released ammonia flows through the exhaust pipe to a region downstream of the SCR catalyst 4. At that time, due to the influence of the ammonia, the downstream ammonia output value Sa detected by the multi-gas sensor 8 changes, and the NOx output value detected by the multi-gas sensor 8 changes.

In view of the above, in S110, the CPU 231 determines whether or not the SCR catalyst 4 is in a high temperature state by determining whether or not the DPF regeneration process is currently being performed.

When the CPU 231 proceeds to S120 as a result of the affirmative determination in S110, in S120, the CPU 231 starts a recording process (storing process) of storing the NOx output value (hereinafter also referred to as the "downstream NOx output value Sn") and the downstream ammonia output value Sa detected by the multi-gas sensor 8. After completing S120, the CPU 231 proceeds to S140.

When the CPU 231 proceeds to S130 as a result of the negative determination in S110, in S130, the CPU 231 stops the recording process (storing process) of storing the downstream NOx output value Sn and the downstream ammonia output value Sa detected by the multi-gas sensor 8. After completing S130, the CPU 231 returns to S110.

In S140 subsequent to S120, the CPU 231 determines whether or not the downstream NOx output value Sn is equal to or greater than a predetermined threshold Ath (in the present embodiment, the current value of the second pumping current Ip2 at the time when the NOx concentration is 100 ppm). When the CPU 231 makes an affirmative determination, the CPU 231 proceeds to S150. When the CPU 231 makes a negative determination, the CPU 231 returns to S110.

When the CPU 231 has proceeded to S150 as a result of the affirmative determination in S140, in S150, the CPU 231 determines whether or not the downstream ammonia output value Sa detected by the multi-gas sensor 8 has passed its peak. When the CPU 231 makes an affirmative determination, the CPU 231 proceeds to S160. When the CPU 231 makes a negative determination, the CPU 231 returns to S110.

When the CPU 231 proceeds to S160 as a result of the affirmative determination in S150, in S160, the CPU 231 determines whether or not the peak values of the downstream NOx output value Sn and the downstream ammonia output value Sa fall within respective valid determination ranges determined in advance in accordance with the respective values. When the CPU 231 makes an affirmative determination, the CPU 231 proceeds to S170. When the CPU 231 makes a negative determination, the CPU 231 proceeds to S190. Notably, in S160, the CPU 231 makes an affirmative determination when both the peak values of the downstream NOx output value Sn and the downstream ammonia output value Sa fall within the valid determination range, and makes a negative determination when at least one of the peak values of the downstream NOx output value Sn and the downstream ammonia output value Sa falls outside the valid determination range.

In the present embodiment, the valid determination range for the peak value of the downstream NOx output value Sn is previously set to the "range of current values which the second pumping current Ip2 can assume when the downstream ammonia concentration falls within a range of 100 to 300 ppm." Also, the valid determination range for the peak value of the downstream ammonia output value Sa is previously set to the "range of values which the ammonia electromotive force EMF can assume when the downstream ammonia concentration falls within a range of 100 to 300 ppm."

When the CPU 231 proceeds to S170 as a result of the affirmative determination in S160, in S170, the CPU 231 computes a downstream ammonia converted value Ca which is a converted value corresponding to the downstream ammonia output value Sa through use of the peak value of the downstream NOx output value Sn detected by the multi-gas sensor 8.

Notably, the NOx detection section 201 of the multi-gas sensor 8 is characterized in that the second pumping current Ip2 changes in accordance not only with a change in the NOx concentration but also with a change in the ammonia concentration. Therefore, the downstream NOx output value Sn detected by the multi-gas sensor 8 can also be used to obtain the downstream ammonia converted value Ca. For example, a numerical value conversion means (a map, a computation expression, etc.) representing the relation between the downstream NOx output value Sn and the downstream ammonia converted value Ca is prepared in advance, and a downstream ammonia converted value Ca corresponding to the peak value of the downstream NOx output value Sn is computed based on the numerical value conversion means, whereby the peak value of the downstream ammonia converted value Ca can be obtained.

In S180 subsequent to S170, the CPU 231 computes the Gain correction coefficient through use of the peak value of the downstream ammonia output value Sa detected by the multi-gas sensor 8 and the peak value of the downstream ammonia converted value Ca obtained in S170, and stores the Gain correction coefficient (calculation result) in the RAM or storage section (hard disc or the like; not shown) of the multi-gas sensor control apparatus 9. Specifically, the CPU 231 stores, as the Gain correction coefficient, a value obtained by dividing the peak value of the downstream ammonia converted value Ca by the peak value of the downstream ammonia output value Sa.

In S190 subsequent to S180, the CPU 231 determines whether or not a plurality of Gain correction coefficients have been stored. When the CPU 231 makes an affirmative determination, the CPU 231 proceeds to S200. When the CPU 231 makes a negative determination, the CPU 231 returns to S110.

Notably, in the present embodiment, one calculation result (Gain correction coefficient) is obtained every time the DPF regeneration process is performed one time. However, calculation errors may be produced. Therefore, the one calculation result (Gain correction coefficient) is not used as is. Namely, the Gain correction coefficient is updated through use of a plurality of calculation results (Gain correction coefficients) obtained as a result of performing the DPF regeneration process a plurality of times, whereby the influence of the calculation errors is reduced. Therefore, the correction coefficient calculation process includes a step of determining whether or not a plurality of Gain correction coefficients have been stored (S190).

When the CPU 231 has proceeded to S200 as a result of the affirmative determination in S190, in S200, the CPU 231 calculates the average of the plurality of Gain correction coefficients. The average may be moving average, weighted average, arithmetic average, or the like. Further, for example, the number of Gain correction coefficients used for calculation of the average may be determined in advance.

In S210 subsequent to S200, the CPU 231 updates the Gain correction coefficient used for computing the corrected downstream ammonia output value Sa. Specifically, the CPU 231 sets (stores) the average of the Gain correction coefficients calculated in S200 to be used as the Gain correction coefficient used for computing the corrected downstream ammonia output value Sa.

After completing S210, the CPU 231 returns to S110.

The CPU 231 continues the above-described correction coefficient calculation process until the microcomputer 230 of the multi-gas sensor control apparatus 9 stops. Namely, every time the DPF regeneration process is executed, a determination is made as to whether or not the downstream NOx output value Sn and the downstream ammonia output value Sa detected by the multi-gas sensor 8 fall within the respective valid determination ranges. In the case where the downstream NOx output value Sn and the downstream ammonia output value Sa fall within the respective valid determination ranges, the Gain correction coefficient is calculated based on the downstream NOx output value Sn and the downstream ammonia output value Sa. After a plurality of Gain correction coefficients are stored, the average of the plurality of Gain correction coefficients is set (stored) to be used as the Gain correction coefficient used for computing the corrected downstream ammonia output value Sa.

Figure 6:
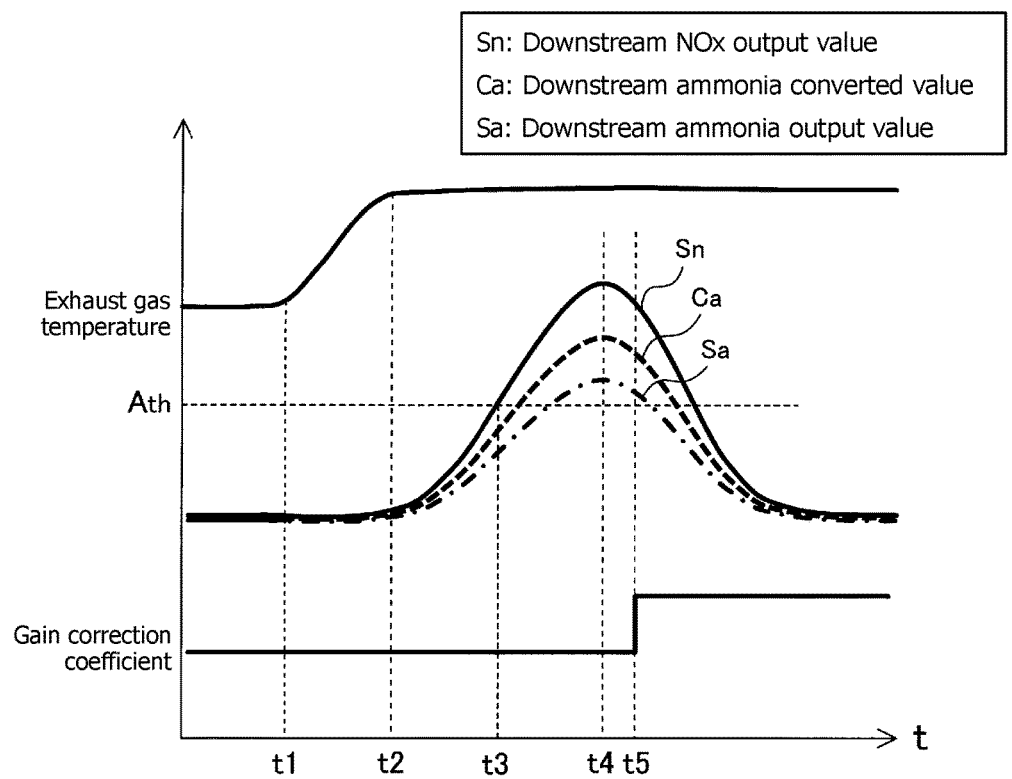
FIG. 6 is a graph showing exemplary changes in exhaust gas temperature, downstream NOx output value, and downstream ammonia output value when DPF regeneration is started.

FIG. 6 is a graph showing exemplary changes in the exhaust gas temperature, the downstream NOx output value Sn, the downstream ammonia converted value Ca, and the downstream ammonia output value Sa when DPF regeneration is started.

Notably, the downstream NOx output value Sn is the value of the second pumping current Ip2. The downstream ammonia converted value Ca is the converted value of the downstream ammonia output value Sa computed based on the downstream NOx output value Sn. The downstream ammonia output value Sa is the value of the ammonia electromotive force EMF.

As shown in FIG. 6, when DPF regeneration is started at time t1, after that point in time, the exhaust gas temperature increases gradually, and when the exhaust gas temperature exceeds a predetermined temperature at time t2, after that point in time, the downstream NOx output value Sn and the downstream ammonia output value Sa increase. Subsequently, the downstream NOx output value Sn exceeds the threshold Ath at time t3, and the downstream ammonia output value Sa reaches its peak at time t4. After that point in time, during a period up to time t5, the downstream ammonia converted value Ca is computed based on the peak value of the downstream NOx output value Sn at time t4, and the Gain correction coefficient is computed. Further, the average of the plurality of Gain correction coefficients is computed, and at time t5, the Gain correction coefficient is updated through use of the average of the Gain correction coefficients.

Notably, FIG. 6 shows a state in which the downstream ammonia output value Sa is smaller than the downstream ammonia converted value Ca; i.e., a state in which the downstream ammonia output value Sa has changed due to the state (deterioration, poisoning, etc.) of the ammonia detection section 202 of the multi-gas sensor 8. The Gain correction coefficient is updated in accordance with such a state, and the downstream ammonia output value Sa is corrected through use of the updated Gain correction coefficient. Thus, the error involved in calculating the ammonia concentration through use of the downstream ammonia output value Sa can be reduced.

[1-5. Effects]

As having been described above, when the multi-gas sensor control apparatus 9 of the present embodiment determines that the DPF regeneration process is currently performed (an affirmative determination in S110) during execution of the correction coefficient calculation process, the multi-gas sensor control apparatus 9 starts the recording process (storing process) of recording (storing) the downstream NOx output value Sn and the downstream ammonia output value Sa detected by the multi-gas sensor 8 (S120).

Subsequently, the multi-gas sensor control apparatus 9 computes the downstream ammonia converted value Ca through use of the peak value of the downstream NOx output value Sn (S170) and calculates the Gain correction coefficient based on the result of comparing the downstream ammonia converted value Ca and the downstream ammonia output value Sa (S180).

By computing the downstream ammonia converted value Ca through use of the downstream NOx output value Sn and comparing the downstream ammonia converted value Ca with the downstream ammonia output value Sa as described above, it becomes possible to determine whether or not the downstream ammonia output value Sa has changed due to the influence of the state (deterioration, poisoning, etc.) of the ammonia detection section 202 of the multi-gas sensor 8. Namely, by comparing the downstream ammonia converted value Ca and the downstream ammonia output value Sa, the Gain correction coefficient can be computed in accordance with the state of the ammonia detection section 202.

Since the multi-gas sensor control apparatus 9 uses ammonia released from the SCR catalyst 4 in a high temperature state when it computes the Gain correction coefficient, a special process (process of injecting a reducing agent (urea, ammonia, or the like)) for computing the Gain correction coefficient becomes unnecessary.

When the SCR catalyst 4 is in a high temperature state, the multi-gas sensor control apparatus 9 can compute the Gain correction coefficient at an arbitrary timing. Therefore, as compared with the case where the timing of computation of the Gain correction coefficient is limited to the time of fuel cut, it becomes easier to select a timing at which no NOx is present in the exhaust pipe 52.

Therefore, according to the multi-gas sensor control apparatus 9, since the timing of computation of the Gain correction coefficient is not limited to the time of fuel cut, the degree of complication associated with computing the Gain correction coefficient is mitigated. Also, according to the multi-gas sensor control apparatus 9, the frequency of computing (updating) the Gain correction coefficient increases. Therefore, when the downstream ammonia output value Sa has changed due to the state (deterioration, poisoning, etc.) of the ammonia detection section 202 of the multi-gas sensor 8, the downstream ammonia output value Sa can be quickly corrected, whereby a decrease in the accuracy in detecting the ammonia concentration can be prevented.

Further, according to the multi-gas sensor control apparatus 9, ammonia is supplied from the SCR catalyst 4 at the time of computation of the Gain correction coefficient. Therefore, a special process (process of injecting a reducing agent (urea, ammonia, or the like)) for computing the Gain correction coefficient becomes unnecessary. Thus, the apparatus structure can be prevented from becoming complex.

In the multi-gas sensor control apparatus 9, the sensor output (downstream NOx output) of the NOx detection section 201 of the multi-gas sensor 8 is detected as a state quantity which changes with the downstream ammonia concentration. The ammonia detection section 202 for detecting the downstream ammonia output value Sa is provided as the multi-gas sensor 8 in which the ammonia detection section 202 is integrated with the NOx detection section 201.

Since the ammonia detection section 202 and the NOx detection section 201 are integrally provided in the multi-gas sensor 8, the respective gas detection positions of the two detection sections are not remote from each other and coincide with each other. As a result, the downstream ammonia output value Sa output from the ammonia detection section 202 and the downstream NOx output value Sn output from the NOx detection section 201 show changes in the exhaust gas in the same state.

By using the downstream ammonia converted value Ca computed through use of such a downstream NOx output value Sn, the Gain correction coefficient on which the state (deterioration, poisoning, etc.) of the ammonia detection section 202 is reflected can be obtained more accurately by computing the Gain correction coefficient based on the result of comparing the downstream ammonia converted value Ca and the downstream ammonia output value Sa.

Therefore, according to the multi-gas sensor control apparatus 9, the Gain correction coefficient on which the state (deterioration, poisoning, etc.) of the ammonia detection section 202 is reflected can be obtained more accurately. As a result, a decrease in the accuracy in detecting the ammonia concentration can be further prevented.

In the multi-gas sensor control apparatus 9, the microcomputer 230 determines whether or not the peak values of the downstream NOx output value Sn and the downstream ammonia output value Sa fall within the respective valid determination ranges which are determined in advance in accordance with the respective values (S160). Based on the result of the determination, the microcomputer 230 permits or prohibits computation of the Gain correction coefficient through use of the downstream NOx output value Sn and the downstream ammonia output value Sa at that time.

In the case where both the downstream NOx output value Sn and the downstream ammonia output value Sa are determined to fall within the respective valid determination ranges (an affirmative determination in S160), the microcomputer 230 permits the computation of the Gain correction coefficient through use of the downstream NOx output value Sn and the downstream ammonia output value Sa (specifically, the downstream ammonia converted value Ca) at that time (S170, S180).

Namely, in the case where both the downstream NOx output value Sn and the downstream ammonia output value Sa fall within the respective valid determination ranges, it is possible to determine that ammonia has reached the ammonia detection section 202 and the NOx detection section 201. Therefore, the Gain correction coefficient computed through use of the downstream NOx output value Sn and the downstream ammonia output value Sa (specifically, the downstream ammonia converted value Ca) at that time is a proper value which reflects the state (deterioration, poisoning, etc.) of the ammonia detection section 202.

In the case where at least one of the downstream NOx output value Sn and the downstream ammonia output value Sa is determined to fall outside the corresponding valid determination range (a negative determination in S160), the microcomputer 230 prohibits the computation of the Gain correction coefficient through use of the downstream NOx output value Sn and the downstream ammonia output value Sa at that time.

Namely, in the case where at least one of the downstream NOx output value Sn and the downstream ammonia output value Sa falls outside the corresponding valid determination range, there is a possibility that ammonia has not yet reached at least one of the ammonia detection section 202 and the NOx detection section 201. Therefore, the Gain correction coefficient computed through use of the downstream NOx output value Sn and the downstream ammonia output value Sa (specifically, the downstream ammonia converted value Ca) at that time is not a value which reflects the state (deterioration, poisoning, etc.) of the ammonia detection section 202.

In view of the foregoing, based on the result of the determination in S160, the microcomputer 230 permits or prohibits the computation of the Gain correction coefficient through use of the downstream NOx output value Sn and the downstream ammonia output value Sa (specifically, the downstream ammonia converted value Ca) at that time. Thus, it becomes possible to obtain the Gain correction coefficient of a proper value which reflects the state (deterioration, poisoning, etc.) of the ammonia detection section 202 and prevents the Gain correction coefficient from being set to an improper value.

Therefore, according to the multi-gas sensor control apparatus 9, setting of the Gain correction coefficient to an improper value is prevented. Thus, a decrease in the accuracy in detecting the ammonia concentration can be prevented.

[1-6. Corresponding Structure]

Next, structure corresponding to terms used herein to describe the present embodiment include the following.

The urea SCR system 1 corresponds to an example of the purification system; and the multi-gas sensor control apparatus 9 corresponds to an example of the concentration calculation apparatus.

The SCR catalyst 4 corresponds to an example of the selective reduction catalyst; the urea water injector 5 corresponds to an example of the reducing agent supply section; the DPF 3 corresponds to an example of the filter section; the multi-gas sensor 8 corresponds to an example of the multi-sensor; the ammonia detection section 202 of the multi-gas sensor 8 corresponds to an example of the first sensor (ammonia sensor); and the NOx detection section 201 of the multi-gas sensor 8 corresponds to an example of the second sensor (NOx sensor).

The Gain correction coefficient corresponds to an example of the correction value; the microcomputer 230 executing S120 corresponds to examples of the first sensor output detection section and the second sensor output detection section; the microcomputer 230 executing S170 corresponds to an example of the converted value computation section; and the microcomputer 230 executing S180 corresponds to an example of the correction value computation section.

S170 corresponds to an example of the converted value computation step; and S180 corresponds to an example of the correction value computation step.

2. Second Embodiment

In the above-described first embodiment, the urea SCR system 1 in which the oxidation catalyst 2, the SCR catalyst 4, and the DPF 3 are disposed in this order in the exhaust pipe 52 has been described as an example of the purification system. However, the purification system is not limited to such a configuration.

A second urea SCR system 301 in which a lean NOx trap 302 (LNT 302), a DPF 3, an SCR catalyst 4 are disposed in this order will be described as a second embodiment.

Notably, in the following description of the second embodiment, descriptions of details identical to those of the first embodiment will be omitted or simplified. Structural elements identical to those of the first embodiment are denoted by the same reference numerals.

[2-1. Second Urea SCR System]

Figure 7:
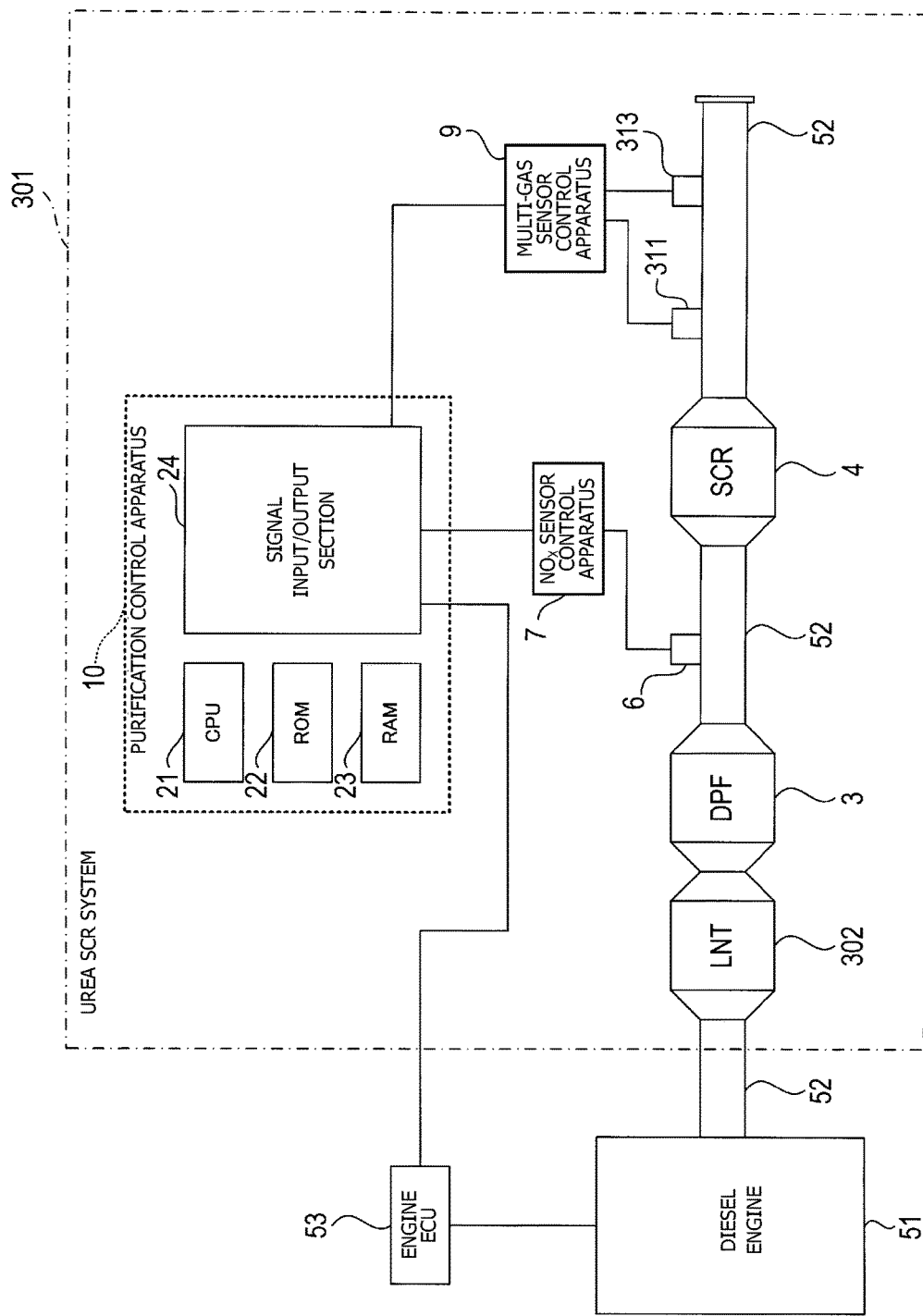
FIG. 7 is a diagram schematically showing the configuration of a second urea SCR system.

As shown in FIG. 7, the second urea SCR system 301 includes the LNT (Lean NOx Trap) 302, the DPF 3, the SCR catalyst 4, an upstream NOx sensor 6, an NOx sensor control apparatus 7, an ammonia sensor 311, a downstream NOx sensor 313, a multi-gas sensor control apparatus 9, and a purification control apparatus 10.

Notably, in the following description of the second urea SCR system 301, descriptions of details identical to those of the urea SCR system 1 of the first embodiment will be omitted or simplified. Structural elements identical to those of the first embodiment are denoted by the same reference numerals.

The LNT 302 receives the exhaust gas discharged from the diesel engine 51 through the exhaust pipe 52 of the diesel engine 51, occludes NOx in the received exhaust gas, and purifies the occluded NOx.

Namely, the LNT 302 exhibits a function of adsorbing (storing) NOx in the exhaust gas at the time of lean combustion of the diesel engine 51. Also, at the time of rich combustion of the diesel engine 51, the LNT 302 reduces the adsorbed NOx for purification, through use of hydrogen ($H_2$) and carbon monoxide (CO) within the exhaust gas, whereby water ($H_2O$), carbon dioxide ($CO_2$), and nitrogen ($N_2$) are produced. At that time, ammonia ($NH_3$) is produced as a by-product. Namely, the LNT 302 exhibits an NOx occluding function at the time of lean combustion, and exhibits an NOx purifying function and an $NH_3$ producing function at the time of rich combustion.

The ammonia produced by the LNT 302 is used as a reducing agent for the NOx reduction at the SCR catalyst 4. Namely, the LNT 302 is provided so as to purify the exhaust gas containing NOx and supply ammonia to the SCR catalyst 4 as a reducing agent.

When the NOx reduction at the SCR catalyst 4 is performed, the engine ECU 53 controls the operation state of the internal combustion engine such that rich combustion occurs. As a result, ammonia serving as the reducing agent is produced at the LNT 302.

The ammonia sensor 311 and the downstream NOx sensor 313 are provided instead of the multi-gas sensor 8. Namely, the ammonia sensor 311 has the same function as the ammonia detection section 202, and the downstream NOx sensor 313 has the same function as the NOx detection section 201.

The multi-gas sensor control apparatus 9 controls the ammonia sensor 311 in the same manner as the ammonia detection section 202, and controls the downstream NOx sensor 313 in the same manner as the NOx detection section 201.

The microcomputer 230 of the multi-gas sensor control apparatus 9 executes a correction coefficient calculation process similar to the correction coefficient calculation process of the first embodiment.

Namely, every time the DPF regeneration process is performed, the microcomputer 230 determines whether or not the downstream NOx output value Sn and the downstream ammonia output value Sa detected by the downstream NOx sensor 313 and the ammonia sensor 311 fall within the respective valid determination ranges. In the case where the downstream NOx output value Sn and the downstream ammonia output value Sa fall within the respective valid determination ranges, the microcomputer 230 calculates the Gain correction coefficient based on the downstream NOx output value Sn and the downstream ammonia output value Sa. After a plurality of Gain correction coefficients are stored, the microcomputer 230 sets (stores) the average of the plurality of Gain correction coefficients to be used as the Gain correction coefficient used for computation of the corrected downstream ammonia output value Sa.

[2-2. Effects]

As having been described above, when the multi-gas sensor control apparatus 9 of the second embodiment determines that the DPF regeneration process is currently being performed (an affirmative determination in S110) during execution of the correction coefficient calculation process, like the multi-gas sensor control apparatus 9 of the first embodiment, the multi-gas sensor control apparatus 9 of the second embodiment starts the recording process (storing process) of recording (storing) the downstream NOx output value Sn and the downstream ammonia output value Sa detected by the downstream NOx sensor 313 and the ammonia sensor 311 (S120).

Subsequently, the multi-gas sensor control apparatus 9 computes the downstream ammonia converted value Ca through use of the peak value of the downstream NOx output value Sn (S170) and calculates the Gain correction coefficient based on the result of comparing the downstream ammonia converted value Ca and the downstream ammonia output value Sa (S180).

By computing the downstream ammonia converted value Ca through use of the downstream NOx output value Sn and comparing the downstream ammonia converted value Ca with the downstream ammonia output value Sa as described above, it becomes possible to determine whether or not the downstream ammonia output value Sa has changed due to the influence of the state (deterioration, poisoning, etc.) of the ammonia sensor 311. Namely, by comparing the downstream ammonia converted value Ca and the downstream ammonia output value Sa, the Gain correction coefficient can be computed in accordance with the state of the ammonia sensor 311.

Since the multi-gas sensor control apparatus 9 uses ammonia released from the SCR catalyst 4 in a high temperature state when it computes the Gain correction coefficient, a special process (process of injecting a reducing agent (urea, ammonia, or the like)) for computing the Gain correction coefficient becomes unnecessary.

When the SCR catalyst 4 is in a high temperature state, the multi-gas sensor control apparatus 9 can compute the Gain correction coefficient at an arbitrary timing. Therefore, as compared with the case where the timing of computation of the Gain correction coefficient is limited to the time of fuel cut, it becomes easier to select a timing at which no NOx is present in the exhaust pipe 52.

Therefore, according to the multi-gas sensor control apparatus 9, since the timing of computation of the Gain correction coefficient is not limited to the time of fuel cut, the degree of complication associated with the computation of the Gain correction coefficient is mitigated. Also, according to the multi-gas sensor control apparatus 9, the frequency of computing (updating) the Gain correction coefficient increases. Therefore, when the downstream ammonia output value Sa has changed due to the state (deterioration, poisoning, etc.) of the ammonia sensor 311, the downstream ammonia output value Sa can be quickly corrected, whereby a decrease in the accuracy in detecting the ammonia concentration can be prevented.

Further, according to the multi-gas sensor control apparatus 9, ammonia is supplied from the SCR catalyst 4 at the time of computation of the Gain correction coefficient. Therefore, a special process (process of injecting a reducing agent (urea, ammonia, or the like)) for computing the Gain correction coefficient becomes unnecessary. Thus, the apparatus structure can be prevented from becoming complex.

[2-3. Corresponding Structure]

Next, structure corresponding to terms used herein to describe the present embodiment include the following.

The second urea SCR system 301 corresponds to an example of the purification system; and the multi-gas sensor control apparatus 9 corresponds to an example of the concentration calculation apparatus.

The SCR catalyst 4 corresponds to an example of the selective reduction catalyst; the lean NOx trap 302 (LNT 302) corresponds to an example of the reducing agent supply section; the DPF 3 corresponds to an example of the filter section; the ammonia sensor 311 corresponds to an example of the first sensor (ammonia sensor); and the downstream NOx sensor 313 corresponds to an example of the second sensor (NOx sensor).

The Gain correction coefficient corresponds to an example of the correction value; the microcomputer 230 executing S120 corresponds to examples of the first sensor output detection section and the second sensor output detection section; the microcomputer 230 executing S170 corresponds to an example of the converted value computation section; and the microcomputer 230 executing S180 corresponds to an example of the correction value computation section.

S170 corresponds to an example of the converted value computation step; and S180 corresponds to an example of the correction value computation step.

3. Other Embodiments

While two embodiments of the present invention have been described, the present invention is not limited thereto.

In the above-described embodiments, a configuration has been described in which the NOx output value (downstream NOx output value Sn) detected by the NOx detection section 201 of the multi-gas sensor 8 or the downstream NOx sensor 313 is used as a state quantity used for computing the downstream ammonia converted value Ca. However, the present invention is not limited thereto. For example, a configuration may be employed in which an ammonia sensor for correction is provided on the exhaust pipe, and the sensor output from the ammonia sensor for correction is utilized as a state quantity used for computing the downstream ammonia converted value Ca.

Notably, the ammonia sensor for correction may be disposed in a region within the exhaust pipe, the region being located near the position of the ammonia detection section 202 of the multi-gas sensor 8 or the position of the ammonia sensor 311 (for example, the distance between the region and the ammonia detection section 202 or the ammonia sensor 311 is 10 cm or less). In this case, the sensor output from the ammonia sensor for correction and the downstream ammonia output value Sa (the sensor output from the ammonia detection section 202 of the multi-gas sensor 8 or the ammonia sensor 311) show changes in the exhaust gas in the same state. Through use of the converted value (downstream ammonia converted value Ca) computed through use of the sensor output from such an ammonia sensor for correction, the Gain correction coefficient on which the state (deterioration, poisoning, etc.) of the ammonia sensor is reflected can be obtained more accurately by computing the Gain correction coefficient based on the result of comparing the converted value and the ammonia sensor output (downstream ammonia output value Sa).

In the above-described embodiments, the correction coefficient calculation process includes the step (S160) of determining whether or not the peak values of the downstream NOx output value Sn and the downstream ammonia output value Sa fall within the respective valid determination ranges. However, the correction coefficient calculation process may be configured without use of such a step. Namely, the microcomputer 230 executing the correction coefficient calculation process may compute the Gain correction coefficient irrespective of the numerical values of the downstream NOx output value Sn and the downstream ammonia output value Sa. In the correction coefficient calculation process of such a configuration, since the determination process in S160 becomes unnecessary, it is possible to prevent the processing load of the microcomputer 230 of the multi-gas sensor control apparatus 9 from becoming excessively high.

In the above-described embodiments, a configuration has been described which includes the NOx sensor control apparatus 7, the multi-gas sensor control apparatus 9, and the purification control apparatus 10. However, the present invention is not limited to such a configuration. For example, in place of the control apparatuses 7, 9, and 10, an integrated control apparatus having the functions of the control apparatuses 7, 9, and 10 may be provided.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application No. 2016-206020 filed Oct. 20, 2016, incorporated herein by reference in its entirety.

What is claimed is:

1. A concentration calculation apparatus for calculating a downstream ammonia concentration of a purification system, the purification system comprising a selective reduction catalyst disposed in an exhaust pipe of an internal combustion engine so as to purify exhaust gas discharged from the internal combustion engine and containing NOx; a reducing agent supply section for supplying a reducing agent to the selective reduction catalyst; a filter section disposed in the exhaust pipe so as to remove particulate matter from the exhaust gas; an ammonia sensor for detecting a downstream ammonia concentration which is the concentration of ammonia contained in the exhaust gas having passed through the selective reduction catalyst and the filter section; and an NOx sensor for detecting a NOx concentration in the exhaust gas having passed through the selective reduction catalyst and the filter section, wherein the NOx sensor has an output value which changes not only with a change in the NOx concentration but also with a change in the downstream ammonia concentration; and the concentration calculation apparatus comprises a microcomputer programmed to:
acquire an output value of the ammonia sensor;
acquire the NOx sensor output value;
calculate a correction value using the ammonia sensor output value and the NOx sensor output value during a regeneration process for the filter section; and
calculate the downstream ammonia concentration based on the sensor output value of the ammonia sensor and the correction value.

2. The concentration calculation apparatus as claimed in claim 1,
wherein the microcomputer is further programmed to:
compute at least one of an output converted value of the ammonia sensor output value and a concentration converted value of the downstream ammonia concentration through use of the NOx sensor output value, and
compute the correction value based on the result of comparison between the ammonia sensor output value and the output converted value or the result of comparison between the downstream ammonia concentration and the concentration converted value.

3. The concentration calculation apparatus as claimed in claim 1, wherein the microcomputer is further programmed to:
determine whether or not the NOx sensor output value during the regeneration process for the filter section is equal to or greater than a predetermined threshold value, and
compute the correction value when the output value determination section determines that the NOx sensor output value is equal to or greater than the threshold value and does not compute the correction value when the output value determination section determines that the NOx sensor output value is not equal to or greater than the threshold value.

4. The concentration calculation apparatus as claimed in claim 1, wherein the ammonia sensor is provided in the form of a multi-sensor in which the ammonia sensor is integrated with the NOx sensor.

5. A concentration calculation system comprising:
a concentration calculation apparatus as claimed in claim 1;
an ammonia sensor; and
an NOx sensor.

6. The concentration calculation system according to claim 5, wherein the ammonia sensor is provided in the form of a multi-sensor in which the ammonia sensor is integrated with the NOx sensor.

7. The concentration calculation apparatus as claimed in claim 1, wherein the microcomputer is configured to calculate the downstream ammonia concentration by multiplying the sensor output value of the ammonia sensor by the correction value.

8. A concentration calculation method for calculating a downstream ammonia concentration of a purification system, the purification system comprising a selective reduction catalyst disposed in an exhaust pipe of an internal combustion engine so as to purify exhaust gas discharged from the internal combustion engine and containing NOx; a reducing agent supply section for supplying a reducing agent to the selective reduction catalyst; a filter section disposed in the exhaust pipe so as to remove particulate matter from the exhaust gas; a first sensor for detecting a downstream ammonia concentration which is the concentration of ammonia contained in the exhaust gas having passed through the selective reduction catalyst and the filter section; and a second sensor for detecting a specific component concentration which is the concentration of a specific component which is contained in the exhaust gas having passed through the selective reduction catalyst and the filter section and which differs from ammonia, the concentration calculation method calculating the downstream ammonia concentration based on the first sensor output value which is an output of the first sensor, wherein
the second sensor has an output value which changes not only with a change in the specific component concentration but also with a change in the downstream ammonia concentration;
the concentration calculation method comprises a correction value computation step of computing a correction value for correcting the first sensor output value or the downstream ammonia concentration, through use of the first sensor output value and the second sensor output value during a regeneration process for the filter section;
the concentration calculation method calculates the downstream ammonia concentration based on the first sensor output value and the correction value;
the first sensor is an ammonia sensor; and
the second sensor is an NOx sensor.

9. The concentration calculation method according to claim 8, wherein the ammonia sensor is provided in the form of a multi-sensor in which the ammonia sensor is integrated with the NOx sensor.

* * * * *